United States Patent
Otsu et al.

(10) Patent No.: US 8,341,589 B2
(45) Date of Patent: Dec. 25, 2012

(54) PACKAGING DESIGN AIDING DEVICE AND METHOD

(75) Inventors: Saki Otsu, Fukuoka (JP); Akira Arata, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/048,593

(22) Filed: Mar. 15, 2011

(65) Prior Publication Data
US 2011/0231808 A1   Sep. 22, 2011

(30) Foreign Application Priority Data
Mar. 16, 2010   (JP) ................. 2010-059804

(51) Int. Cl.
G06F 15/04   (2006.01)
G06F 17/50   (2006.01)

(52) U.S. Cl. ........ 716/139; 716/102; 716/108; 716/111; 716/112; 716/137

(58) Field of Classification Search .......... 716/112–115, 716/126–130, 137, 102, 110, 111, 139
See application file for complete search history.

(56) References Cited

U.S. PATENT DOCUMENTS

| | | | | |
|---|---|---|---|---|
| 5,850,349 A * | 12/1998 | Hirai et al. | .............. | 716/124 |
| 6,202,195 B1 * | 3/2001 | Tanaka et al. | ............... | 716/113 |
| 6,584,608 B1 * | 6/2003 | Kumada et al. | ............... | 716/129 |
| 6,789,243 B2 * | 9/2004 | Nakagawa et al. | ........... | 716/124 |
| 7,251,801 B2 * | 7/2007 | Ozawa et al. | ................ | 716/126 |
| 7,793,249 B1 * | 9/2010 | Wadland et al. | .............. | 716/129 |
| 7,810,063 B1 * | 10/2010 | Sharma et al. | ................ | 716/139 |
| 8,060,849 B2 * | 11/2011 | He et al. | ......................... | 716/126 |
| 8,065,649 B2 * | 11/2011 | Hetzel et al. | .................. | 716/126 |
| 2009/0249265 A1 * | 10/2009 | Arata | ................................. | 716/4 |

FOREIGN PATENT DOCUMENTS

JP   2003-345844   12/2003

* cited by examiner

*Primary Examiner* — Nha Nguyen (74) *Attorney, Agent, or Firm* — Fujitsu Patent Center (57) ABSTRACT

A packaging design aiding device, including a storage unit to store component information that specifies another electronic component to be connected with an electronic component and a constraint that specifies a range of a wiring distance, a wiring determination unit to specify the electronic component and the another electronic component to be connected based on the component information and to determine a wiring there between, a wiring distance calculation unit to calculate the wiring distance between the electronic component, a display form determination unit to determine a display form based on the calculated wiring distance and the constraint, and a display control unit to display the wiring that connects the electronic component and the another electronic component in the determined display form.

6 Claims, 11 Drawing Sheets

FIG. 10A

PACKAGING DESIGN AIDING DEVICE AND METHOD

CROSS-REFERENCE TO RELATED APPLICATIONS

This application is based upon and claims the benefit of priority of the prior Japanese Patent Application No. 2010-59804, filed on Mar. 16, 2010, the entire contents of which are incorporated herein by reference.

FIELD

The embodiments discussed herein are related to a packaging design aiding device that aids a designer in designing wiring of a plurality of electronic components which are displayed on a display unit and a packaging design aiding method used therein.

BACKGROUND

Nowadays, design of packaging such as arrangement of electronic components or arrangement of wirings on a printed wiring board or a ceramic board is efficiently performed using a substrate (board) designing device which is called a Computer Aided Design (CAD) device. In the substrate designing device, when once electronic components which have been network-defined are sequentially arranged on a substrate which is displayed on a monitor, a wiring which is called a rat's nest that connects electronic components concerned with each other is automatically displayed on the monitor. Owing to automatic display of the rat's nest, a designer is allowed to omit such complicated work as to wire the electronic components with each other. However, in some cases, such a problem may generate that each electronic component has a plurality of pins and the number of rat's nests for linking the pins of mating electronic components with each other is increased and hence visibility is reduced.

There is proposed a device that displays a rat's nest that links electronic components concerned with each other so as to have a line width, a color or a form in accordance with the number of wirings between them (as disclosed, for example, Japanese Laid-open Patent Publication No. 2003-345844).

SUMMARY

According to an aspect of the invention, a packaging design aiding device includes:

a storage unit to store component information that specifies another electronic component to be connected with an electronic component and a constraint that specifies a range of a wiring distance, a wiring determination unit to specify the electronic component and the another electronic component to be connected based on the component information and to determine a wiring there between, a wiring distance calculation unit to calculate the wiring distance between the electronic component and the another electronic component, a display form determination unit to determine a display form based on the calculated wiring distance and the constraint, and a display control unit to display the wiring that connects the electronic component and the another electronic component in the determined display form.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

It may be difficult to grasp a distance between electronic components to be wired with each other simply by displaying a rat's nest that links the electronic components with each other so as to have a line width, a color or a form in accordance with the number of wirings between them.

In the following, embodiments of a packaging design aiding device and a packaging design aiding method involving a technique which has been discussed hereinabove will be described with reference to the accompanying drawings.

A packaging design aiding device according to an embodiment is a device that aids a designer in designing packaging such as, for example, arrangement of electronic components (for example integrated circuit (IC) chips) and arrangement of wirings on a printed wiring board or a ceramic board. In the following, although the packaging design aiding device will be described as a general personal computer with a monitor, the packaging design aiding device may be, for example, a computer of the type which is used by connecting with a separate monitor, a computer dedicated to packaging design, a cell phone, a Personal Digital Assistant (PDA) or the like.

Figure 1:
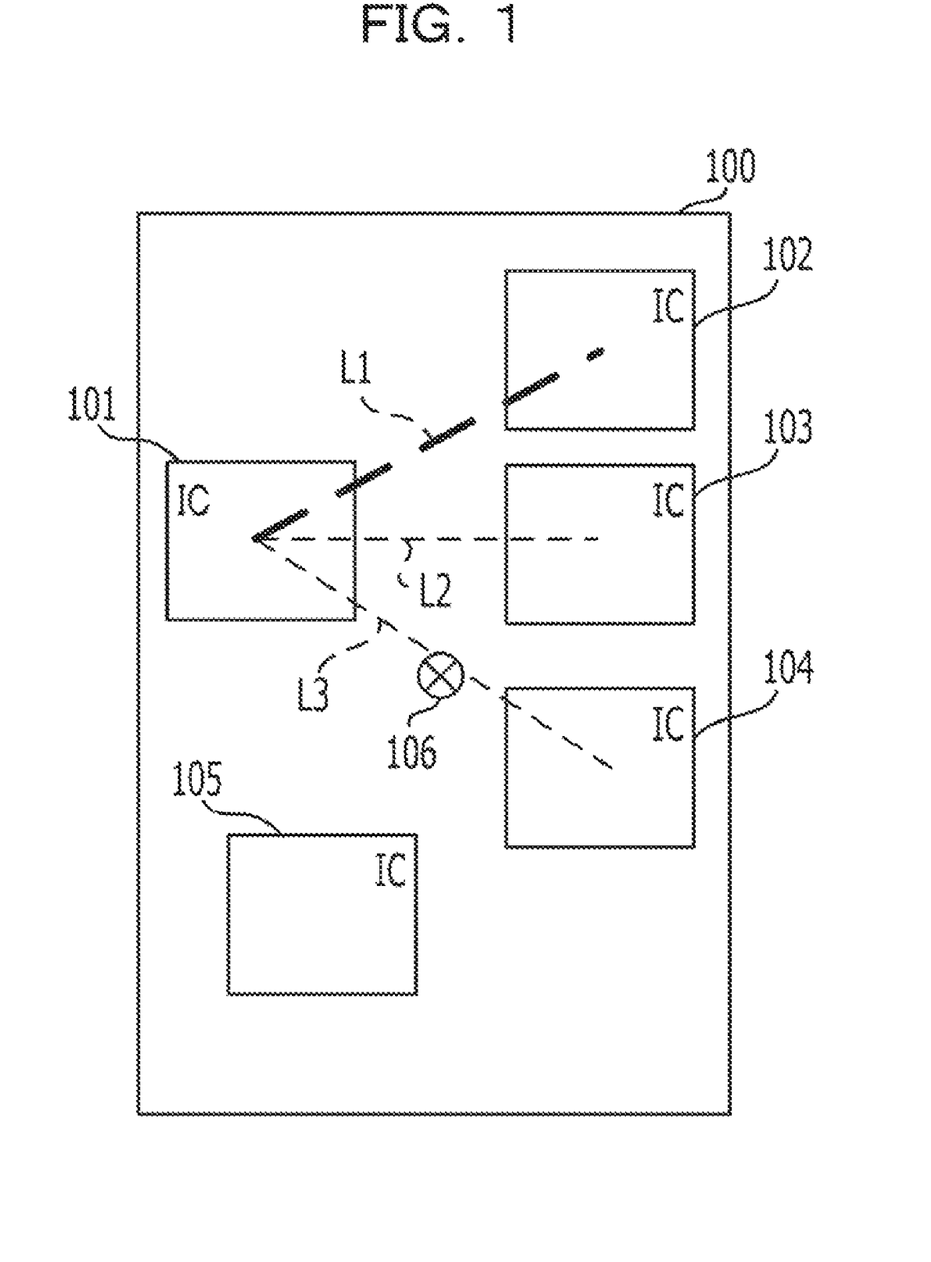
FIG. 1 is a diagram illustrating an example of a display screen of a packaging design aiding device according to one embodiment.

FIG. 1 is a diagram illustrating an example of a display screen of a packaging design aiding device according to the embodiment.

On the screen of the packaging design aiding device according to the embodiment, an image 100 (hereinafter, referred to as a board (substrate)) corresponding to a printed wiring board or a ceramic board and images (hereinafter referred to as electronic components) 101, 102, 103, 104 and 105 corresponding to electronic components to be packaged on the printed wiring board or the like. The electronic components 101, 102, 103, 104 and 105 are moved under the operation of a designer and are disposed at positions where the designer desires to dispose the components on the board 100.

In the case that an electronic component to be wired has been designated under the operation of the designer, another electronic component to be connected with the designated electronic component is specified. In the explanation of this embodiment, it is assumed that each of the electronic components 102, 103 and 104 is to be connected with the electronic component 101. Then, one straight line (hereinafter, referred to as a rat's nest) that connects electronic components concerned with each other is displayed on the screen of the packaging design aiding device. Specifically, a rat's nest L1 that connects the electronic components 101 and 102 with each other, a rat's nest L2 that connects the electronic components 101 and 103 with each other and a rat's nest L3 that connects the electronic components 101 and 104 with each other are respectively displayed on the screen. Incidentally, although in the example illustrated in FIG. 1, the rat's nests L1, L2 and L3 are displayed in the form of dotted lines, all the rat's nests may be displayed in the form of solid lines or in the form of lines of different types.

The rat's nests L1, L2 and L3 are displayed with line widths and in display colors in accordance with the number of wirings between electronic components to be connected with each other and the wiring distance between them. The number of wirings is the number of signal lines that link with each other the pins of electronic components through which one signal is input and output. As the number of wirings between electronic components is increased, the rat's nests L1, L2 and L3 are displayed with wider line widths. For example, the rat's nest L1 that connects the electronic components 101 and 102 with each other is displayed with a line which is bolder than that of the rat's nest that connects the electronic components 101 and 104 with each other, which indicates that the number of wirings between the electronic components 101 and 102 is larger than that of the wirings between the electronic components 101 and 104.

The wiring distance may be a straight distance between electronic components concerned or a Manhattan distance which will be described later. In the case that the wiring distance between electronic components concerned is long, there is a possibility that influence of transmission noise may be exerted on the electronic components. Thus, a shorter wiring distance may reduce a possibility that influence of transmission noise may be exerted on the electronic components. Accordingly, in the case that the straight distance between electronic components concerned is long, the rat's nest L1, L2 or L3 is displayed in red which may give a dangerous or warning impression. In the case that the straight distance is short, the rat's nest L1, L2 or L3 is displayed in blue which may give a safe impression. In the case that the wiring distance between electronic components concerned is long and anti-noise measures are to be taken on the wiring between the electronic components, a warning mark 106 is displayed on the rat's nest (the rat's nest L3 in the example illustrated in FIG. 1) between the electronic components concerned.

Even when a plurality of wirings are disposed between the electronic components, the number of wirings is displayed using one rat's nest. Therefore, it may become easier for the designer to grasp the connective relation between the electronic components. In addition, the strength of wirings between electronic components is determined depending on the number of wirings between the electronic components. It may become easier for the designer to visually grasp the strength of wirings between the electronic components by changing the line width of each of the rat's nests L1, L2 and L3 in accordance with the number of wirings between the electronic components concerned. In addition, it may become possible for the designer to visually recognize the wiring distance between the electronic components by observing the display color of each rat's nest. Thus, in the case that a certain rat's nest is displayed in red, the designer is allowed to optimally dispose electronic components concerned by bringing them closer to each other or by taking some measures other than the above. In addition, it may become possible to make the designer change the arrangement of electronic components so as to reduce the wiring distance between the electronic components or to make the designer take anti-noise measures by displaying the warning mark 106.

Incidentally, the electronic components 101, 102, 103, 104 and 105 may be moved under the operation of the designer and in the case that the display positions of the electronic components have been changed, the display color of each rat's nest is changed in accordance with the wiring distance between the electronic components obtained after position change thereof. Owing to the above mentioned operation, it may become possible for the designer to attain optimum packaging design by moving the electronic components while visually observing the rat's nests L1, L2 and L3.

Next, concrete configuration and operation of the packaging design aiding device will be described in detail.

Figure 2:
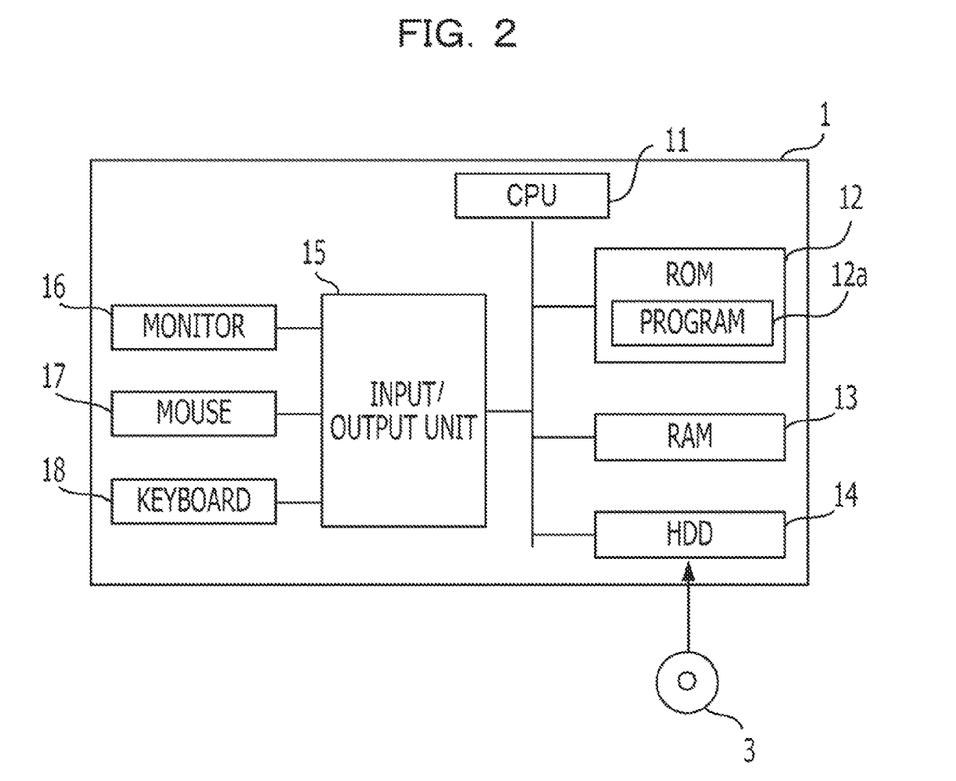
FIG. 2 is a diagram illustrating an example of a hardware configuration of a packaging design aiding device according to one embodiment.

FIG. 2 is a block diagram illustrating an example of a hardware configuration of a packaging design aiding device according to an embodiment.

A packaging design aiding device 1 includes hardware components such as a Central Processing unit (CPU) 11, a Read Only Memory (ROM) 12, a Random Access Memory (RAM) 13, a hard disk drive (hereinafter, referred to as an HDD) 14, an input/output unit 15 and the like. The above mentioned hardware components are connected with one another via a bus. The input/output unit 15 is an interface used to connect the device with a monitor 16, a mouse 17, a keyboard 18 and the like.

The CPU 11 appropriately reads out a program 12*a* which is stored in advance in the ROM 12 to execute the program and controls the operations of the above mentioned hardware components. The ROM 12 stores the program 12*a* therein. The RAM 13 is, for example, a Static RAM (SRAM), a Dynamic RAM (DRAM), a flash memory or the like. The RAM 13 temporarily stores therein various pieces of data which may generate when the CPU 11 executes the program 12*a*.

The HDD 14 stores therein various pieces of data and various programs which may be desired. As an alternative, the program 12*a* may be used by being stored in a recording medium 3 such as a Compact Disk-ROM (CD-ROM), a Digital Versatile Disc-ROM (DVD-ROM) or a Magneto-Optical disk (MO) and then installed into the HDD 14 via the recording medium 3 or by being down-loaded from a network.

Figure 3:
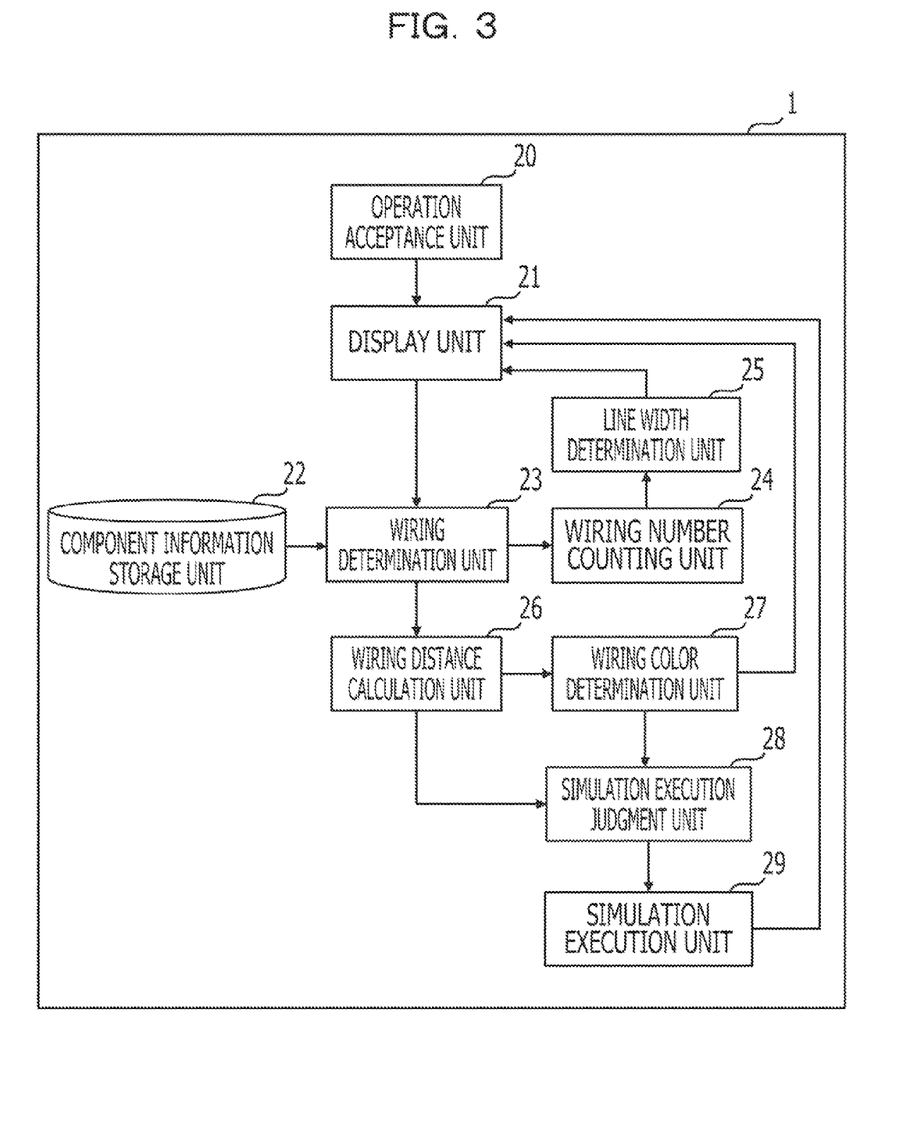
FIG. 3 is a block diagram illustrating an example of functions of the packaging design aiding device.

Next, functions which are implemented using the packaging design aiding device 1 by executing the program 12*a* using the CPU 11 will be described. FIG. 3 is a block diagram illustrating an example of functions that the packaging design aiding device 1 includes. The packaging design aiding device 1 includes functions such as an operation acceptance unit 20, a display unit 21, a component information storage unit 22, a wiring determination unit 23, a wiring number counting unit 24, a line width determination unit 25, a wiring distance calculation unit 26, a wiring color determination unit 27, a simulation execution judgment unit 28, a simulation execution unit 29 and the like.

The operation acceptance unit 20 accepts an operation that the designer performs via the mouse 17 such as, for example, an operation of selecting or moving a displayed electronic component. The display unit 21 displays the board 100, the electronic components 101, 102, 103, 104 and 105, and the rat's nests L1, L2 and L3 on the monitor 16. The display unit 21 changes the display positions of the displayed electronic components 101, 102, 103, 104 and 105 and the display colors of the rat's nests L1, L2 and L3 in accordance with the operation by the designer.

Component information on the electronic components which are displayed on the monitor 16 is stored in advance in the component information storage unit 22. The component information includes characteristic information on the characteristics of electronic components concerned, information used to specify each of other electronic components to be connected with one electronic component, details of wiring between electronic components as to with which pin of each of other electronic components a pin of one electronic component is to be connected, constraint to be met in wiring the electronic components with each other and the like.

The wiring determination unit 23 determines a wiring between electronic components concerned. For example, in the example illustrated in FIG. 1, in the case that the electronic component 101 is to be wired, the wiring determination unit 23 acquires the component information of the electronic component 101 from the component information storage unit 22. Then, the wiring determination unit 23 specifies the electronic component 102, 103 or 104 to be connected with the electronic component 101 on the basis of the component information and determines a wiring for connecting the electronic components with each other. The wiring number counting unit 24 counts (specifies) the number of wirings between the electronic components on the basis of a result of determination of the wiring executed using the wiring determination unit 23.

The line width determination unit 25 determines the line width of each rat's nest in accordance with the number of wirings between the electronic components concerned that the wiring number counting unit 24 has counted. For example, it is assumed that the number of wirings between the electronic components 101 and 102 is 10, the number of wirings between the electronic components 101 and 103 is 8 and the number of wirings between the electronic components 101 and 104 is 6. In the above mentioned case, the line width determination unit 25 determines that the line width of the rat's nest L1 between the electronic components 101 and 102 which is the largest in the number of wirings is 3 mm. Then, the line width determination unit 25 determines that the line width of the rat's nest L2 between the electronic components 101 and 103 is 2.4 mm (=(3 mm/10 wirings)×8 wirings) and the line width of the rat's nest L3 between the electronic components 101 and 104 is 1.8 mm (=(3 mm/10 wirings)×6 wirings). Then, the display unit 21 displays the rat's nests L1, L2 and L3 with the line widths that the line width determination unit 25 has determined.

Incidentally, the line width determination unit 25 does not determine each line width in accordance with the wiring strength relative to the entire board and determines the line width of each rat's nest between mating electronic components as processing objects each time. For example, in the example illustrated in FIG. 1, in the case that the electronic component 105 is connected with an electronic component other than the electronic component 101, the line width of the rat's nest between them is determined independently of the line widths of the rat's nests L1, L2 and L3 which have been determined relative to the electronic component 101.

Figure 4:
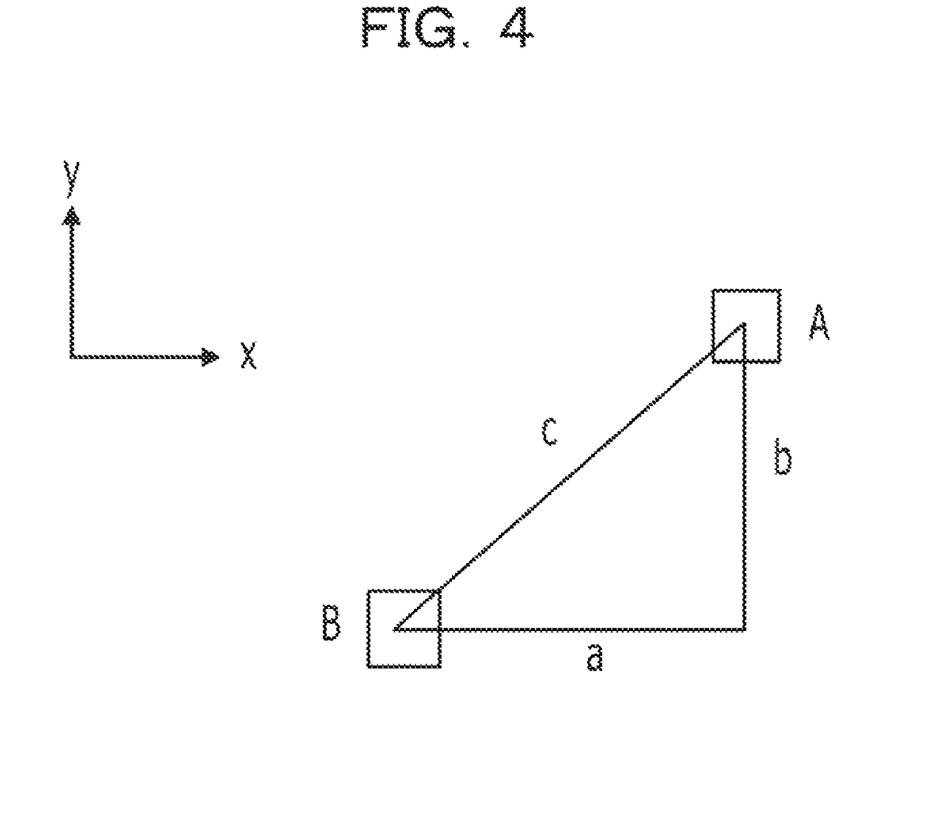
FIG. 4 is a diagram illustrating an example of calculation of a wiring distance.

The wiring distance calculation unit 26 calculates the wiring distance between electronic components to be connected with each other. FIG. 4 is a diagram illustrating an example of calculation of a wiring distance. FIG. 4 illustrates an example of a manner of calculating the wiring distance between electronic components A and B in the case that the electronic component A is to be connected with the electronic component B. In the example illustrated in FIG. 4, it is assumed that the x-axis plots the horizontal direction on paper and the y-axis plots the vertical direction on paper. The wiring distance calculation unit 26 acquires the coordinate positions of the electronic components A and B. In the above mentioned case, the coordinate positions of the central parts of the electronic components A and B may be acquired or the coordinate positions of pins of the electronic components A and B which are connected with the same signal line may be acquired. The wiring distance calculation unit 26 calculates a distance a in the x-axis direction and a distance b in the y-axis direction between the electronic components A and B. Then, the wiring distance calculation unit 26 calculates a Manhattan distance a+b which is obtained by adding the distance a to the distance b as the wiring distance between the electronic components A and B. Alternatively, the wiring distance calculation unit 26 may calculate a straight distance c between the electronic components A and B as the wiring distance between them. The wiring distance that the wiring distance calculation unit 26 calculates may be either the Manhattan distance a+b or the straight distance c.

The wiring color determination unit 27 determines the display color of each rat's nest on the basis of the wiring distance that the wiring distance calculation unit 26 has calculated. More specifically, the wiring color determination unit 27 judges weather the wiring distance that the wiring distance calculation unit 26 has calculated meets the constraint included in the component information. In the constraint, a limited range of wiring distances including a lower limit value (or an upper limit value) which is calculated taking noise into consideration and an upper limit value (or a lower limit value) which is empirically derived, for example, by a designer taking a noise margin into consideration is determined. The wiring color determination unit 27 determines the display color of each rat's nest depending on whether the wiring distance that the wiring distance calculation unit 26 has calculated is within or out of the limited range of wiring distances.

Figure 5:
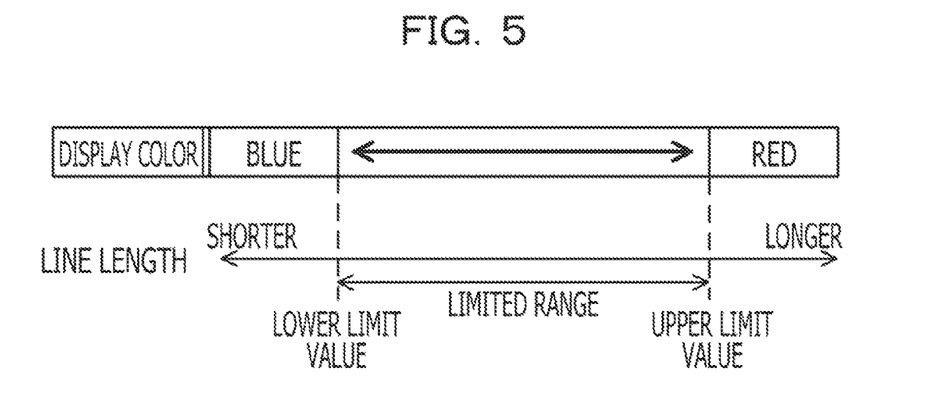
FIG. 5 is a diagram illustrating an example of a manner of determining a display color of a rat's nest concerned.

FIG. 5 is a diagram illustrating an example of a manner of determining the display color of each rat's nest. FIG. 5 illustrates an example of a relation between the wiring distance that the wiring distance calculation unit 26 has calculated and the display color of the corresponding rat's nest. In the case that the wiring distance that the wiring distance calculation unit 26 has calculated is less than the lower limit value in the limited range, the wiring color determination unit 27 determines blue as the display color. On the other hand, in the case that wiring distance that the wiring distance calculation unit 26 has calculated is more than the upper limit value of the limited range, the wiring color determination unit 27 determines red as the display color. In the case that the wiring distance that the wiring distance calculation unit 26 has calculated is within the limited range, the wiring color determination unit 27 determines a color which is turned from blue to red as the wiring distance value gradually increases from the lower limit value and comes closer to the upper limit value by regularly changing the color concentrations of RGB (Red Green Blue) as the display color. For example, in the case that it is assumed that the upper limit value of the limited range is 11 cm and the lower limit value thereof is 8 cm, the wiring color determination unit 27 changes the color concentrations of RGB (Red Green Blue) in six steps at intervals of 0.5 cm to determine the display color corresponding to the wiring distance that the wiring distance calculation unit 26 has calculated. The display unit 21 displays the rat's nest in the display color that the wiring color determination unit 27 has determined.

The simulation execution judgment unit 28 executes a pre-judging process for judging whether simulation analysis is to be executed. The simulation analysis is executed in order to judge whether it is desirable to take anti-noise measures on a wiring between electronic components concerned. In the case that the wiring distance that the wiring distance calculation unit 26 has calculated is more than the upper limit value of the limited range, that is, in the case that the wiring color determination unit 27 has determined red as the display color, the possibility that the influence of noise may be exerted on the electronic components is high. Thus, it may be desirable to judge whether it is desirable to take anti-noise measures on the wiring between the electronic components by executing the simulation analysis. However, execution of the simulation analysis may lead to an increase in process time. Accordingly, even when the wiring distance that the wiring distance calculation unit 26 has calculated is more than the upper limit value of the limited range, execution of undesirable simulation analysis may be avoided by executing the pre-judging process using the simulation execution judgment unit 28. The pre-judging process executed using the simulation execution judgment unit 28 will be described in detail later.

The simulation execution unit 29 executes the simulation analysis in accordance with a result of judgment executed using the simulation execution judgment unit 28. The simulation execution unit 29 executes the simulation analysis to judge whether it is desirable to take anti-noise measures on the wiring between the electronic components. In the case that the simulation execution unit 29 has executed the simulation analysis and then has judged that execution of anti-noise measures is desirable as a result of execution of the simulation analysis, the display unit 21 displays the warning mark 106 on the rat's nest concerned (see FIG. 1). The simulation analysis will be described in detail later.

Next, the pre-judging process executed using the simulation execution judgment unit 28 will be described in detail.

Figure 6:
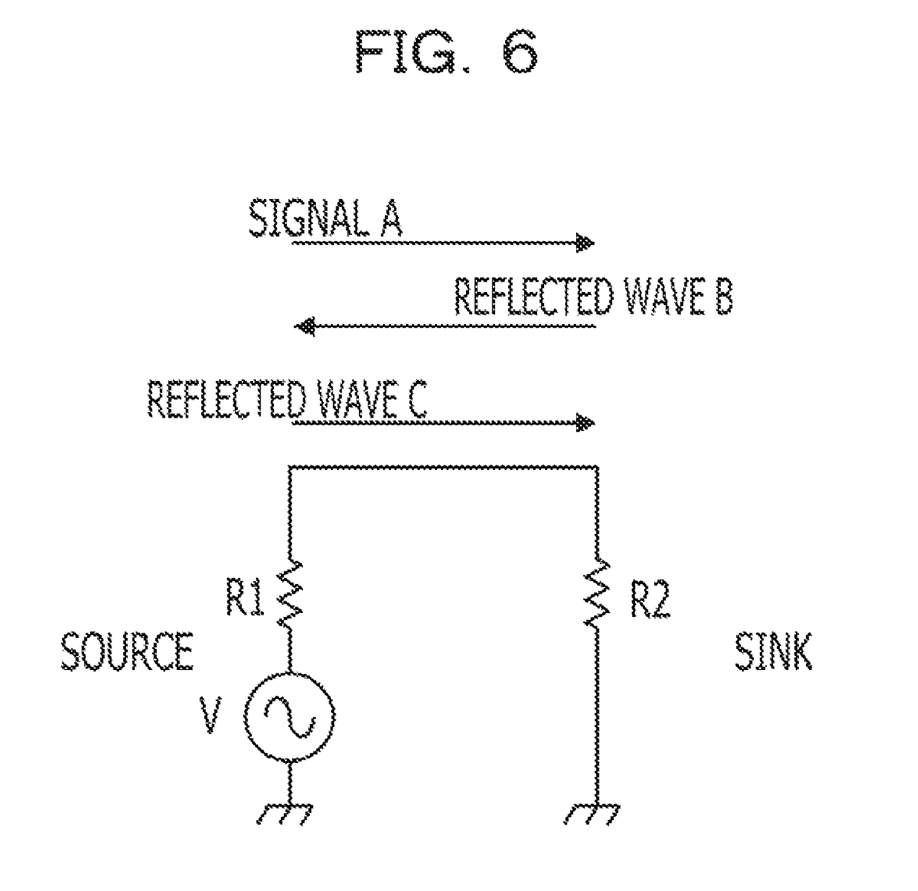
FIG. 6 is a diagram illustrating an example of noise generated in a wiring between electronic components.

FIG. 6 is a diagram illustrating an example of noise generated in a wiring between electronic components concerned. An example of a circuit in which an output resistance R1 of an electronic component on a source side from which a signal is sent out (hereinafter, simply referred to as a source) is connected with an input resistance R2 of an electronic component on a sink side (hereinafter, simply referred to as a sink) is illustrated in FIG. 6. The sink receives a signal in which noise is superposed on a signal which has been output from the source. Specifically, a signal A which has been output from the source passes through a line while being exposed to the impedance (not illustrated) therein and through the input resistance R2 of the sink. In the above mentioned situation, the signal is reflected owing to a difference in magnitude between the impedance and the input resistance R2 and hence a reflected wave B directed from the sink to the source is generated. Likewise, the reflected wave B is reflected owing to a difference in magnitude between the impedance in the line and the output resistance R1 and hence a reflected wave C directed from the source to the sink is generated. The above mentioned signal reflection is repetitively performed and hence distortion which may be derived from the reflected waves may be generated in the signal output from the source.

Figure 7:
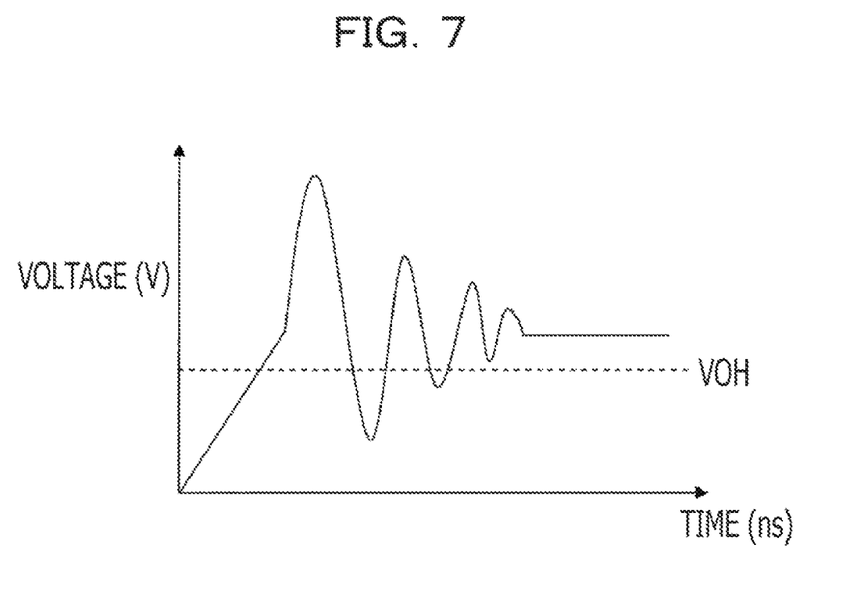
FIG. 7 is a diagram illustrating an example of a waveform of a signal that a sink receives.

FIG. 7 is a diagram illustrating an example of a waveform of a signal that the sink receives. In the drawing, the horizontal axis plots the elapsed time [nsec] and the vertical axis plots the voltage [V] of the signal. In the drawing, VOH indicates a minimum voltage value which is desirable for stable operation of the sink. For the sink, that a signal of a voltage higher than the voltage value VOH has been received indicates that a signal of a voltage which is high enough for its stable operation has been received. Thus, in the case that the signal of the voltage higher than the voltage value VOH has been received, the sink starts stable operation. Every time the sink receives a reflected wave, distortion is generated in the signal sent from the source. The reflected waves are converged with time. Thus, in the case that a first reflected wave has been superposed on the signal after its voltage has reached a value higher than the voltage value VOH, much time may be taken until the voltage is settled to a value higher than the voltage value VOH in the synthesized signal waveform obtained by superposition of the reflected wave on the original signal and a peak voltage value of the signal may possibly become higher than an allowable value. Incidentally, the first reflected wave includes the signal (the reflected wave B in FIG. 6) which has been reflected from the sink to the source and the signal (the reflected wave C in FIG. 6) which has been reflected from the source to the sink.

Thus, the simulation execution judgment unit 28 calculates a line length (an allowable upper limit value) d between the resistances R1 and R2 through which the sink is allowed to receive the first reflected wave before a time (a rise time) at which the voltage of the signal reaches a value higher than the voltage value VOH. In the case that the wiring distance that the wiring distance calculation unit 26 has calculated is longer than the line length d, the simulation execution judgment unit 28 judges that the possibility that the influence of noise may be exerted on the sink is high. In the above mentioned case, it may be desirable for the simulation execution judgment unit 28 to study the transmission noise in more detail. That is, the simulation execution judgment unit 28 judges that the simulation analysis is to be executed. Incidentally, in the case that a plurality of wirings are prepared between the electronic components concerned, the simulation execution judgment unit 28 calculates the line length d on a wiring-by-wiring basis and judges whether the simulation analysis is to be executed each time.

For example, the speed at which a signal is propagated over the line is determined from a line constant. In the case that a glass epoxy material is used as the material of the board, in general, the propagation speed may be about 7 ns/m. In the above mentioned case, a time T taken for the signal to reciprocate between the resistances R1 and R2 may be (2×d)×7 ns/m. On the other hand, a rise time T2 of the signal at a high-speed gate is about 1.5 ns and hence the line length d with which the time T1 matches the time T2 may be 11 cm (=1.5 ns/(2×7 ns/m). In the case that the line length d is longer than 11 cm, the time T1 may become longer than the time T2 and hence the sink may be allowed to receive the first reflected wave before the rise time of the signal. On the other hand, in the case that the line length d is shorter than 11 cm, the time T1 may become shorter than the time T2 and hence the sink may receive the first reflected wave after the rise time of the signal.

That is, in the case that it is assumed that the time taken for propagation of the signal over the line is Vo (ns/m), the rise (the fall) time of the signal is Trf (ns) and the line length is d (m), when the line length d≦Trf/(2×Vo), the simulation execution judgment unit 28 judges that the transmission noise is not considered. On the other hand, when the line length d>Trf/(2×Vo), it is desirable to study the transmission noise in more detail and hence the simulation execution judgment unit 28 judges that the simulation analysis is to be executed.

Next, the simulation analysis that the simulation execution unit 29 executes will be described in detail.

Figure 8:
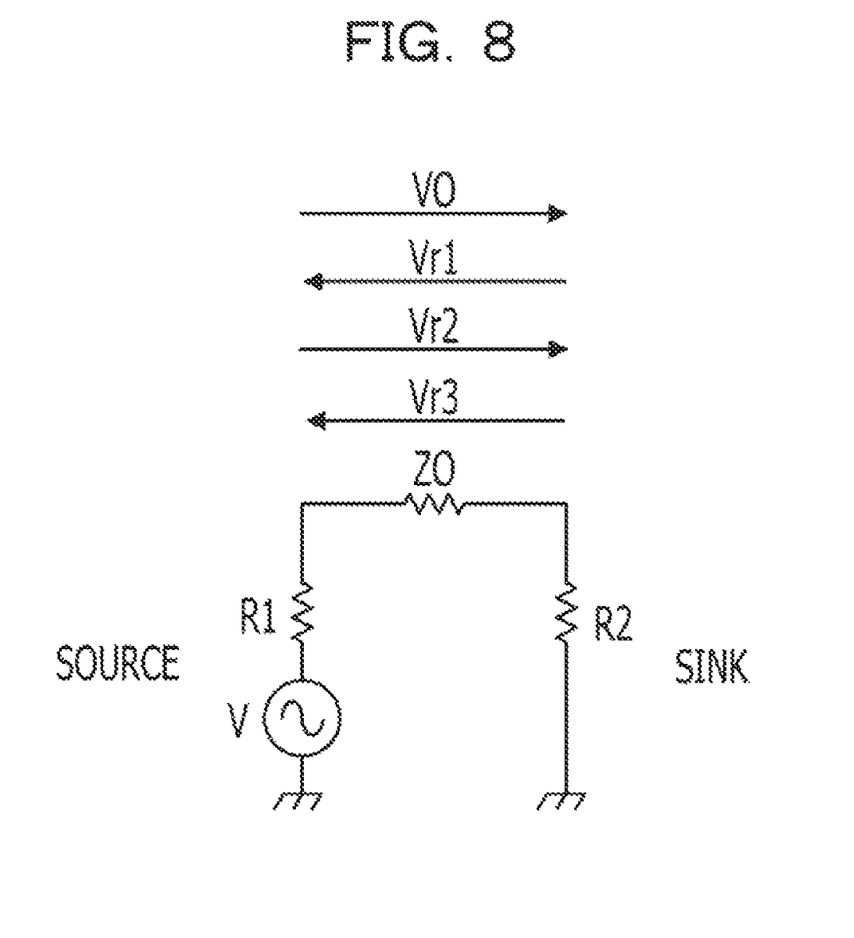
FIG. 8 is a diagram illustrating an example of simulation analysis.

FIG. 8 is a diagram illustrating an example of simulation analysis. A circuit in which the output resistance R1 of the source is connected with the input resistance R2 of the sink is illustrated in FIG. 8 as in the case in FIG. 6 and a characteristic impedance ZO in a connection line is also illustrated. In the example in FIG. 8, it is assumed that a time taken for propagation of a signal between the resistances R1 and R2 is a time t.

In the case that a signal of a voltage of an amplitude VO has been output from the source, the signal reaches the sink after the time t and a reflected wave of a voltage of an amplitude Vr1 is generated owing to mismatching between the characteristic impedance ZO and the input resistance R2 of the sink. The reflected wave is then propagated to the source and a reflected wave of a voltage of an amplitude Vr2 is generated owing to mismatching between the characteristic impedance ZO and the output resistance R1 of the source. The reflected wave of the voltage of the amplitude Vr2 is then propagated to the sink and hence a reflected wave of a voltage of an amplitude Vr3 is generated on the sink side. In the above mentioned situation, relations between the output resistance R1 and the characteristic impedance ZO and between the input resistance R2 and the characteristic impedance ZO are R1<<ZO and R2>>ZO. Judging from the above mentioned relations, the transmission noise input into the sink has a tendency to converge with time.

Figure 9:
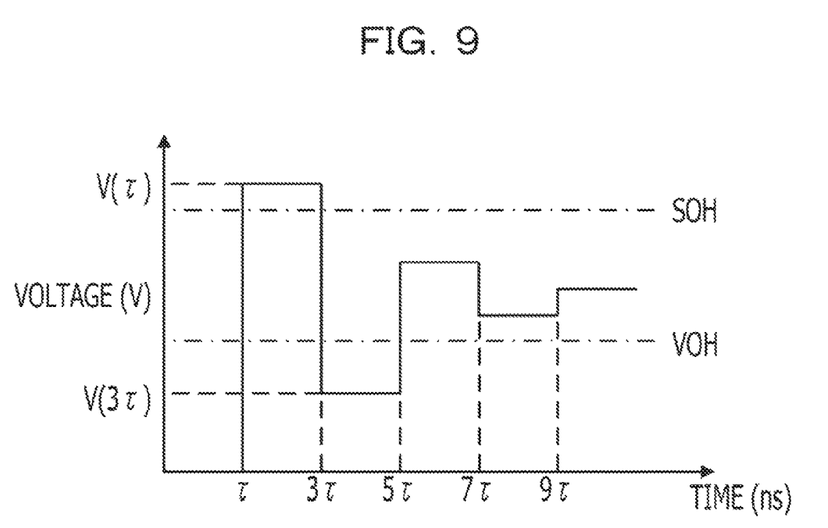
FIG. 9 is a diagram illustrating an example of a voltage waveform of a signal that the sink receives using a circuit illustrated in FIG. 8.

FIG. 9 is a diagram illustrating an example of a voltage waveform of a signal that the sink receives using the circuit illustrated in FIG. 8. In the drawing, the horizontal axis plots the elapsed time [nsec] and the vertical axis plots the voltage [V] of the signal. In addition, voltage values obtained at times $\tau$, $3\tau$, $5\tau$, $7\tau$ and $9\tau$ are indicated. In the drawing, VOH is a minimum voltage value of the signal which is desirable for stable operation of the sink and SOH is a maximum voltage value of the signal reception of which is allowed to the sink. In the case that the sink receives a signal of the voltage higher than the voltage value SOH, the sink may be broken or a malfunction may generate in the sink. As illustrated in the example in FIG. 9, a voltage value $V(\tau)$ obtained when the signal output from the source has reached the sink rises to a maximum voltage to be input into the sink and a voltage value $V(3\tau)$ obtained when the reflected wave has be returned again to the sink drops to a minimum voltage. The voltage values $V(\tau)$ and $V(3\tau)$ may be calculated as follows.

[Numerical Formulae]

$$V(\tau) = V0 + Vr1$$

$$V(3\tau) = V(\tau) + Vr2 + Vr3$$

wherein $$V0 = \frac{Z0}{Z0 + R1} V$$

$$Vr1 = \frac{R2 - Z0}{R2 + Z0} V0$$

$$Vr2 = \frac{R1 - Z0}{R1 + Z0} Vr1$$

$$Vr3 = \frac{R2 - Z0}{R2 + Z0} Vr2$$

The simulation execution unit 29 judges whether the calculated voltage value $V(\tau)$ is lower than the value SOH and the calculated voltage value $V(3\tau)$ is higher than the value VOH. In the case that the voltage value $V(\tau)$ is lower than the value SOH and the voltage value $V(3\tau)$ is higher than the value VOH, the simulation execution unit 29 judges that it is desirable to take measures against the transmission noise on the wiring through which the signal so judged passes.

Figure 10A:
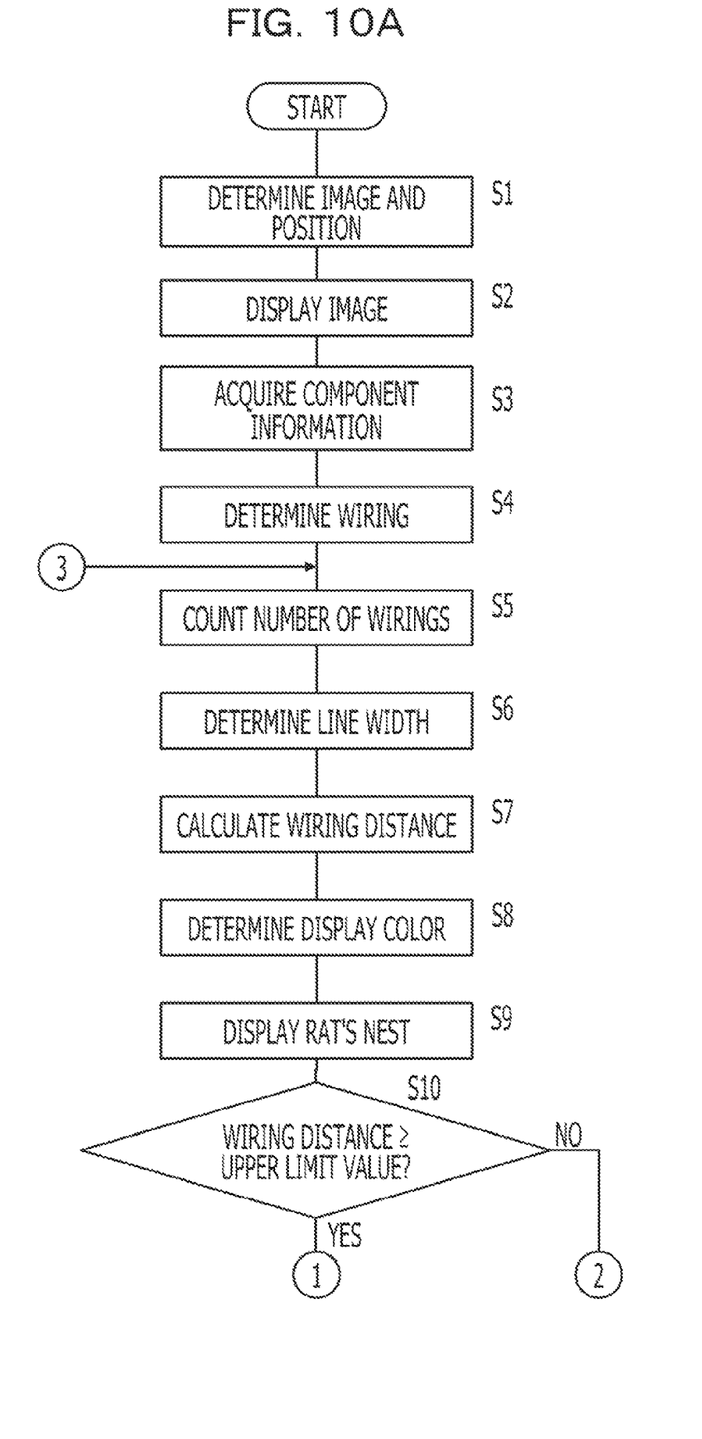
FIG. 10A is a diagram illustrating an example of a flowchart of processing procedures that a packaging design aiding device executes.
Figure 10B:
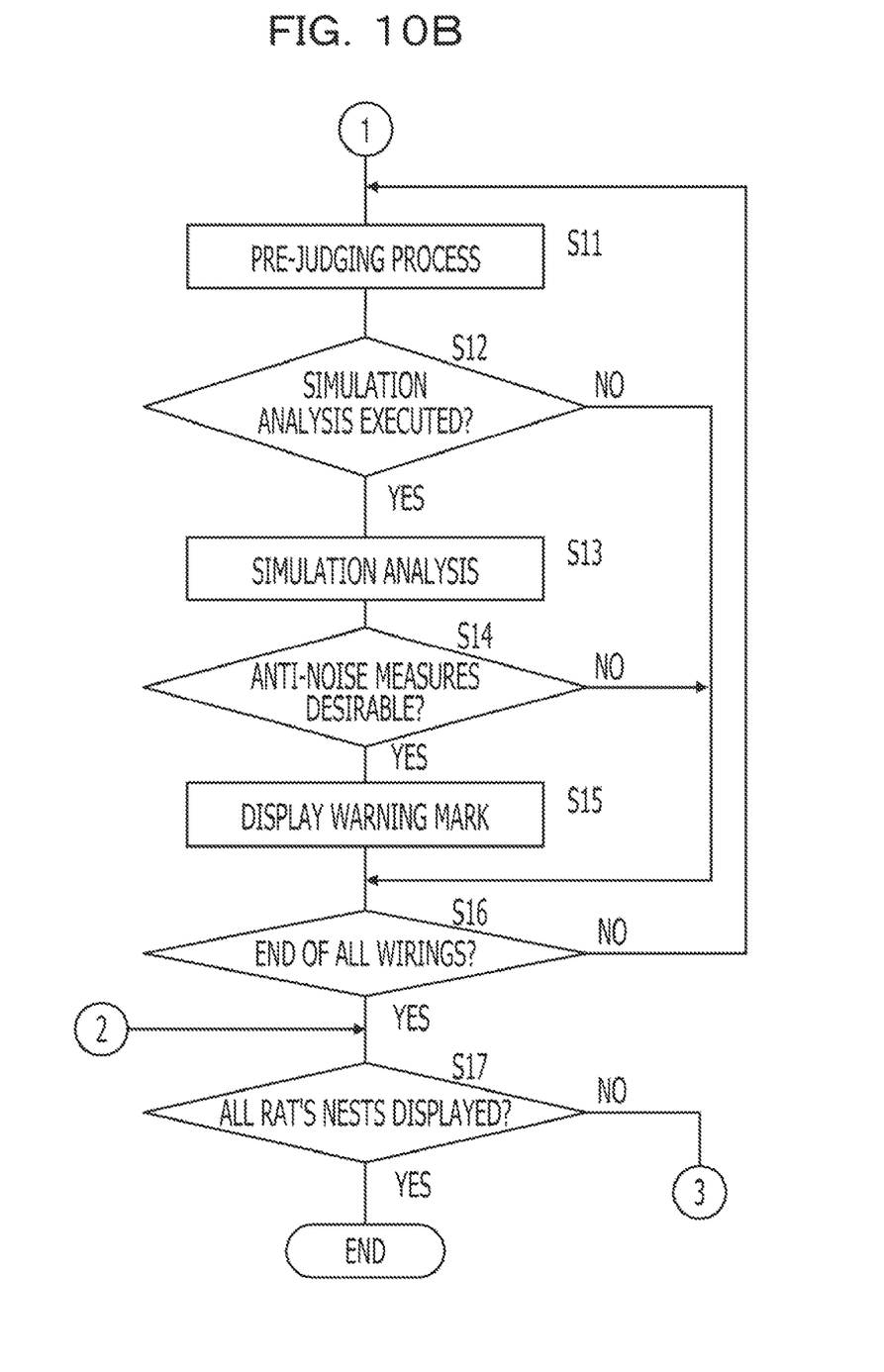
FIG. 10B is a diagram illustrating an example of a flowchart of processing procedures that a packaging design aiding device executes.

Next, operations of the packaging design aiding device 1 will be described in detail. FIGS. 10A and 10B are diagrams illustrating an example of a flowchart of processing procedures that the packaging design aiding device 1 executes. The processes illustrated in FIGS. 10A and 10B are executed using the CPU 11.

The CPU 11 determines images of electronic components or the like to be displayed on a monitor and display positions thereof (S1) and displays the corresponding images on the determined positions (S2). Next, the CPU 11 acquires the component information of one electronic component (for example, the electronic component 101) which is displayed on the monitor (S3), specifies other electronic components (for example, the electronic components 102, 103 and 104) to be connected with one electronic component and determines each wiring for connecting one electronic component with each of other electronic components (S4).

Next, the CPU 11 counts the number of wirings determined (S5) and determines a line width of each rat's nest on the basis of a result of counting (S6). Specifically, the CPU 11 operates to increase the line width as the number of wirings is increased and to decrease the line width as the number of wirings is decreased. Then, the CPU 11 calculates each wiring distance between the electronic components concerned (S7). The wiring distance may be the Manhattan distance or the straight distance between the electronic components as described above.

Then, the CPU 11 determines the display color of each rat's nest on the basis of the constraint included in the component information which has been acquired at S3 and the wiring distance which has been calculated at S7 (S8). For example, in the case that the calculated wiring distance is less than the lower limit value of the limited range included in the constraint, the CPU 11 determines blue as the display color of the rat's nest concerned. On the other hand, in the case that the calculated wiring distance is more than the upper limit value of the limited range, the CPU determines red as the display color of the rat's nest concerned. In addition, in the case that the wiring distance is within the limited range, the CPU 11 determines a color which is turned from blue to red as the wiring distance is increased from the lower limit value and comes closer to the upper limit value by regularly changing the color concentrations of R (red), G (green) and B (Blue) as the display color of the rat's nest concerned. Then, the CPU 11 displays the rat's nest that connects the electronic components with each other with the line width determined at S6 and in the display color determined at S8 (S9).

Next, the CPU 11 judges whether the wiring distance which has been calculated at S7 is more than the upper limit value of the limited range included in the constraint (S10). In the case that the wiring distance is not more than the upper limit value (S10: NO), the CPU 11 judges that it is allowed not to take anti-noise measures on the wiring between the electronic components that the rat's nest connects with each other and moves to the process at S17. In the case that the wiring distance is more than the upper limit value (S10: YES), the CPU executes the pre-judging process (S11). In execution of the pre-judging process, whether the simulation analysis is to be executed is judged. Specifically, as described above, the CPU 11 calculates the line length d of one wiring that connects the electronic components concerned with each other and judges whether the wiring distance which has been calculated at S7 is more than the line length d. In the case that the wiring distance is more than the line length d, the CPU 11 judges that the simulation analysis is to be executed.

As a result of execution of the pre-judging process, the CPU 11 judges whether the simulation analysis is to be executed (S12). In the case that it has been judged not to execute the simulation analysis (S12: NO), the CPU 11 moves to the process at S16. On the other hand, in the case that it has been judged to execute the simulation analysis (S12: YES), the CPU 11 executes the simulation analysis (S13). In execution of the simulation analysis, the CPU 11 calculates maximum and minimum voltage values of the signal that the sink receives and judges whether the maximum voltage value is lower than the maximum voltage value SOH on the sink side and the minimum voltage value is higher than the minimum voltage value VOH on the sink side. In the case that the maximum voltage value is lower than the maximum voltage value SOH and the minimum voltage value is higher than the minimum voltage value VOH, the CPU 11 judges that it is desirable to take anti-noise measures.

As a result of execution of the simulation analysis, the CPU 11 judges whether it is desirable to take anti-noise measures (S14). In the case that it has been judged that it is desirable to anti-noise measures (S14: YES), the CPU 11 displays the warning mark 106 on the rat's nest concerned (S15). In the other hand, in the case that it has been judged that it is allowed not to take anti-noise measures (S14: NO) or after the warning mark has been displayed, the CPU 11 judges whether execution of the pre-judging process on all the wirings between the electronic components as processing objects has been completed (S16). In the case that execution of the pre-judging process on all the wirings is not yet completed (S16: NO), the CPU 11 returns to the process at S11 and executes the pre-judging process on each of other wirings that connect the electronic components concerned with each other. In the case that in repeating the processes at S11 to S16, the warning mark has been already displayed, the CPU 11 omits execution of the process at S15. In the case that execution of the pre-judging process on all the wirings concerned has been completed (S16: YES), the CPU 11 executes the process at S17.

The CPU 11 judges whether rat's rests have been displayed with respect to all the other electronic components which have been wired with one electronic component at S4 (S17). For example, in the example in FIG. 1, the electronic component 101 is connected with each of the electronic components 102, 103 and 104. Then, after the rat's nest L1 between the electronic components 101 and 102 has been displayed, the CPU 11 judges whether the rat's nests between the electronic components 101 and 103 and between the electronic components 101 and 104 have been displayed. In the case that all the rat's nests are not yet displayed (S17: NO), the CPU returns to the process at S5 and executes substantially the same processes as the above on each combination of one electronic component with each of other electronic components. In the case that all the rat's nests have been displayed (S17: YES), the CPU 11 terminates execution of the processing illustrated in FIGS. 10A and 10B.

In the case that an operation of moving a displayed electronic component has been accepted, the CPU 11 executes the processes at S7 to S16 to determine the display color of the rat's nest for the electronic component so moved and executes the pre-judging process, the simulation analysis and the like on the wiring concerned.

As described above, according to the above mentioned embodiment, even when a plurality of wirings are installed between electronic components concerned, the presence of the plurality of wirings is displayed using one rat's nest, so that the designer is allowed to readily grasp the connective relation between the electronic components. In addition, the line width of each rat's nest is determined in accordance with the number of wirings between the electronic components concerned, so that the designer is allowed to readily grasp visually the strength of the wirings between the electronic components. In addition, the designer is allowed to visually recognize the wiring distance between the electronic components concerned by observing the display color of the rat's nest concerned. Through visual recognition of the wiring distance, the designer is allowed to optimize arrangement of the electronic components concerned, for example, by bringing the respective electronic components closer to each other in the case that the rat's nest concerned is displayed in red. In addition, display of the warning mark 106 is desirable to aid the designer in changing the arrangement of the electronic components concerned so as to further reduce the wiring distance between the electronic components concerned or in taking anti-noise measures on the wiring concerned. As described above, the designer is allowed to optimize the arrangement of the electronic components concerned and to smoothly perform packaging design.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A packaging design aiding device, comprising:
a storage unit to store component information that specifies a first electronic component to be connected with a second electronic component and specifies the number of wires needed to connect the first electronic component and the second electronic component, a processor configured to:
specify the first electronic component and the second electronic component to be connected based on the component information and to determine a wiring there between,
calculate the wiring distance between the first electronic component and the second electronic component,
determine a display form based on the calculated wiring distance and the specified number of wires needed to connect the first electronic component and the second electronic component, and
display the wiring that connects the first electronic component and the second electronic component as one wire in the determined display form,
wherein a display color of the one wire is determined based on the calculated wiring distance and a display width of the one wire is determined based on the number of wires that connect the first electronic component and the second electronic component.

2. The packaging design aiding device according to claim 1,
wherein the processor is further configured to:
change a position of the first electronic component and the second electronic component which are displayed on the display unit,
and calculate a wiring distance every time the position of the first electronic component or the second electronic component is changed.

3. The packaging design aiding device according to claim 1, wherein
the storage unit further stores characteristic information of the first electronic component and the second electronic component, and
the processor is further configured to:
the calculate an allowable upper limit of the wiring distance between the first electronic component and the second electronic component based on the characteristic information which corresponds to the first electronic component and the second electronic component,
judge whether the calculated wiring distance is greater than the calculated allowable upper limit,
judge whether it is desirable to take anti-noise measures on the wiring between the first electronic component and the second electronic component when the wiring distance is greater than the allowable upper limit, and
display a warning image together with the wiring when it is desirable to take anti-noise measures.

4. The packaging design aiding device according to claim 1, wherein
calculate the wiring distance calculates a Manhattan distance between the first electronic component and the second electronic component.

5. A packaging design aiding method, the method comprising:
displaying, using a display unit, a plurality of electronic components;
determining, by a processor, a wiring between a first electronic component and a second electronic component displayed on the display unit based on a specified number of wires needed to connect the first electronic component and the second electronic component, the specified number of wires is stored in a storage unit that stores the constraint to be satisfied when an electronic component displayed on the display unit is to be wired,
calculating, by the processor, a wiring distance between the first electronic component and the second electronic component,
determining, by the processor, a display form based on the calculated wiring distance and the specified number of wires needed to connect the first electronic component and the second electronic component, and
displaying on the display unit a single line that connects the first electronic component with the second electronic component in the determined display form,
wherein a display color of the single line is determined based on the calculated wiring distance and a display width of the single line is determined based on the number of wires that connect the first electronic component and the second electronic component.

6. A non-transitory computer-readable recording medium that stores a computer program that causes a computer to execute a method, the method comprising:
displaying, using a display unit, a plurality of electronic components;
determining, by a processor, a wiring between a first electronic component and a second electronic component displayed on the display unit based on a specified number of wires needed to connect the first electronic component and the second electronic component, the specified number of wires is read out of a storage unit,
calculating, by the processor, a wiring distance between the first electronic component and the second electronic component,
determining, by the processor, a display form based on the calculated wiring distance and the specified number of wires needed to connect the first electronic component and the second electronic component, and
displaying a single line that connects the first electronic component with the second electronic component in the determined display form,
wherein a display color of the single line is determined based on the calculated wiring distance and a display width of the single line is determined based on the number of wires that connect the first electronic component and the second electronic component.

* * * * *